United States Patent
Fayolle et al.

(10) Patent No.: US 11,165,079 B2
(45) Date of Patent: Nov. 2, 2021

(54) FUEL CELL SYSTEM

(71) Applicant: Panasonic Intellectual Property Management Co., Ltd., Osaka (JP)

(72) Inventors: Marine Fayolle, Osaka (JP); Satoru Tamura, Chiba (JP); Yosuke Kitazawa, Osaka (JP); Takao Hayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 204 days.

(21) Appl. No.: 16/426,642

(22) Filed: May 30, 2019

(65) Prior Publication Data
US 2019/0379072 A1    Dec. 12, 2019

(30) Foreign Application Priority Data
Jun. 12, 2018  (JP) .............................. JP2018-111806

(51) Int. Cl.
| | |
|---|---|
| *H01M 8/04* | (2016.01) |
| *H01M 8/04701* | (2016.01) |
| *H01M 8/04007* | (2016.01) |
| *H01M 8/18* | (2006.01) |
| *H01M 8/0612* | (2016.01) |
| *H01M 8/04014* | (2016.01) |

(52) U.S. Cl.
CPC ... *H01M 8/04731* (2013.01); *H01M 8/04022* (2013.01); *H01M 8/04074* (2013.01); *H01M 8/04716* (2013.01); *H01M 8/04738* (2013.01); *H01M 8/0618* (2013.01); *H01M 8/188* (2013.01)

(58) Field of Classification Search
CPC ......... H01M 8/04022; H01M 8/04047; H01M 8/04731; H01M 8/04738; H01M 8/04716; H01M 8/18; H01M 8/188; H01M 8/0618
See application file for complete search history.

(56) References Cited

U.S. PATENT DOCUMENTS

| | | |
|---|---|---|
| 4,407,902 A | 10/1983 | Kummer et al. |
| 2008/0187789 A1* | 8/2008 | Ghezel-Ayagh ............................ H01M 8/04014 429/414 |

(Continued)

FOREIGN PATENT DOCUMENTS

JP    2017-500692    1/2017

OTHER PUBLICATIONS

Extended European Search Report dated Nov. 11, 2019 for the related European Patent Application No. 19176114.7.

*Primary Examiner* — Amanda C. Walke
(74) *Attorney, Agent, or Firm* — McDermott Will & Emery LLP

(57) ABSTRACT

A fuel cell system includes a fuel cell, a regenerator, an oxidant feed path, a gas discharge path, and a heat exchanger. The fuel cell includes an anode and a cathode and reduces a mediator with the cathode. The regenerator oxidizes, with an oxidant, the mediator reduced by the cathode. Through the oxidant feed path, the oxidant is guided to the regenerator. Through the gas discharge path, the gas present inside the regenerator is guided out of the regenerator. The heat exchanger heats the oxidant by exchanging heat between the oxidant flowing in the oxidant feed path and the gas flowing in the gas discharge path.

8 Claims, 2 Drawing Sheets

(56) References Cited

U.S. PATENT DOCUMENTS

| | | | |
|---|---|---|---|
| 2010/0003545 A1* | 1/2010 | Horne | H01M 8/20 |
| | | | 429/471 |
| 2012/0107702 A1 | 5/2012 | Creeth et al. | |
| 2014/0302410 A1* | 10/2014 | Iyengar | H01M 8/04216 |
| | | | 429/411 |
| 2016/0301094 A1 | 10/2016 | Longman | |
| 2017/0256803 A1* | 9/2017 | Evans | H01M 8/0245 |
| 2017/0326497 A1* | 11/2017 | Verbakel | B01D 53/78 |
| 2018/0219241 A1* | 8/2018 | Chen | H01M 8/04276 |
| 2018/0375131 A1* | 12/2018 | Hauth | H01M 8/04402 |
| 2019/0321798 A1* | 10/2019 | Steinfeld | C01B 3/063 |

\* cited by examiner

FUEL CELL SYSTEM

BACKGROUND

1. Technical Field

The present disclosure relates to a fuel cell system.

2. Description of the Related Art

A fuel cell system that uses a catholyte containing a redox couple is known.

For example, Japanese Unexamined Patent Application Publication (Translation of PCT Application) No. 2017-500692 describes a fuel cell assembly that includes a fuel cell stack and a regeneration section. The fuel cell stack includes membrane electrode assemblies each of which includes an anode and a cathode. The catholyte containing a redox couple is supplied to the fuel cell stack, comes into flowing contact with the cathode of the membrane electrode assemblies, and then is supplied to the regeneration section. To the regeneration section, an oxidant is supplied by a supply device. The redox couple in the catholyte is reduced by reaction at the cathode. After the reaction at the cathode, the catholyte passes away from the cathode and onto the regeneration section. The oxidant supplied to the regeneration section oxidizes the redox couple in the catholyte, at least partially. The heat, steam, and other by-products produced during the reaction at the regeneration section are discharged from the regeneration section.

SUMMARY

Japanese Unexamined Patent Application Publication (Translation of PCT Application) No. 2017-500692, however, does not specifically discuss how to handle the heat, steam, and other by-products after the discharge from the regeneration section. One non-limiting and exemplary embodiment therefore provides a fuel cell system advantageous in safe discharge of the gas present inside a regenerator and accelerating the oxidation of a mediator at the regenerator.

In one general aspect, the techniques disclosed here feature a fuel cell system. The fuel cell system includes a fuel cell that includes an anode and a cathode and generates electricity by reducing a mediator at the cathode; a regenerator that oxidizes, with an oxidant, the mediator reduced by the cathode; an oxidant feed path through which the oxidant is supplied to the regenerator; a gas discharge path through which a gas present inside the regenerator is discharged out of the regenerator; and a heat exchanger that heats the oxidant by exchanging heat between the oxidant flowing in the oxidant feed path and the gas flowing in the gas discharge path.

This fuel cell system allows for safe discharge of a gas present inside its regenerator and, moreover, is advantageous in accelerating the oxidation of a mediator at the regenerator.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
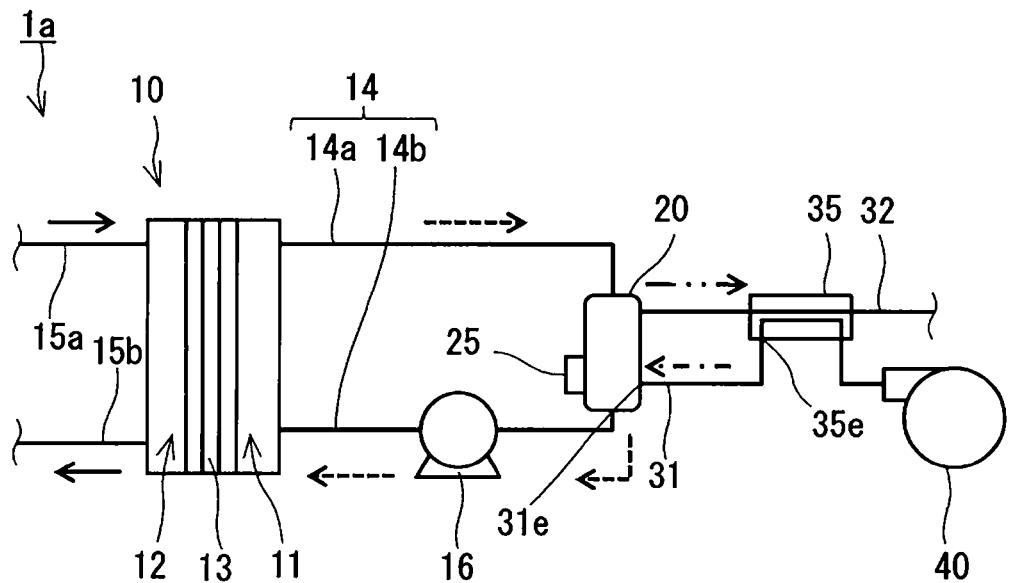
FIG. 1 illustrates an example of a fuel cell system according to the present disclosure.

Underlying Knowledge Forming Basis of the Present Disclosure

Fuel cells, such as solid-polymer fuel cells, are not very efficient in reactions for power generation primarily because the cathodic reduction of oxygen proceeds slowly. A potential solution to this is to supply a solution containing a readily reducible mediator to the cathode of the fuel cell. This eliminates the need for the use of platinum in making the cathode.

The mediator reduced at the cathode is regenerated through oxidation by an oxidant and then can be recycled to the cathode. As a result, the mediator can be reduced and regenerated repeatedly. The oxidation of the mediator, however, is exothermic, which means the oxidation of the mediator produces heat, thereby causing part of the solvent in the solution of the mediator to evaporate into vapor. As a result, the regenerator, for regenerating the mediator, may contain a gas that is relatively hot. This gas may contain unreacted oxidant. The inventors have found that in such a fuel cell system, discharging the gas present inside the regenerator can cause safety issues because of the high temperature of the gas. Supplying the regenerator with a relatively cold (e.g., 20° C. to 40° C.) oxidant, however, prevents fast oxidation of the mediator. After extensive research to solve these problems, the inventors discovered that it is effective in solving these problems to heat the oxidant to be supplied to the regenerator by heat exchange between the oxidant and the gas discharged from the regenerator. The fuel cell system according to the present disclosure is based on this new insight.

Overview of Aspects of the Disclosure

A fuel cell system according to a first aspect of the present disclosure includes: a fuel cell that includes an anode and a cathode and generates electricity by reducing a mediator at the cathode; a regenerator that oxidizes, with an oxidant, the mediator reduced by the cathode; an oxidant feed path through which the oxidant is supplied to the regenerator; a gas discharge path through which the gas present inside the regenerator is discharged out of the regenerator; and a heat exchanger that heats the oxidant by exchanging heat between the oxidant flowing in the oxidant feed path and the gas flowing in the gas discharge path.

In the first aspect, the oxidant flowing in the oxidant feed path and the gas flowing in the gas discharge path exchange heat at the heat exchanger, and, as a result, the oxidant is heated. In other words, the gas flowing in the gas discharge path is cooled at the heat exchanger. This reduces the temperature of the gas discharged from the regenerator out of the fuel cell system, thereby allowing the gas present inside the regenerator to be discharged out of the fuel cell system safely. The oxidant, moreover, is heated at the heat exchanger, helping the oxidant to be supplied at an increased temperature to the regenerator. As a result, the oxidation of the mediator at the regenerator is accelerated.

In a second aspect of the present disclosure, for example, the fuel cell system according to the first aspect further includes a circulation path that loops between the cathode and the regenerator wherein, through the circulation path, the mediator discharged from the cathode is guided to the regenerator, and the mediator oxidized at the regenerator is returned to the cathode. In the second aspect, the circulation path allows the mediator to circulate between the cathode and the regenerator.

In a third aspect of the present disclosure, for example, the fuel cell system according to the first or second aspect further includes a thermal insulator that covers at least part of the oxidant feed path between the heat exchanger and the regenerator. In the third aspect, the thermal insulator keeps the oxidant hot after heating at the heat exchanger, thereby allowing a hot oxidant to be supplied to the regenerator. As a result, the oxidation of the mediator at the regenerator is accelerated.

In a fourth aspect of the present disclosure, for example, the fuel cell system according to any one of the first to third aspects further includes a thermal insulator that covers at least part of the gas discharge path between the regenerator and the heat exchanger. In the fourth aspect, the thermal insulator keeps the gas discharged from the regenerator hot, thereby helping the oxidant to be heated to a high temperature at the heat exchanger. This makes it more certain that the oxidation of the mediator at the regenerator is accelerated.

In a fifth aspect of the present disclosure, for example, the fuel cell system according to any one of the first to fourth aspects further includes a heater that heats the oxidant flowing in the oxidant feed path. In the fifth aspect, heating the oxidant with the heater makes it more certain that the oxidant is supplied at an increased temperature to the regenerator. As a result, the oxidation of the mediator at the regenerator is accelerated.

In a sixth aspect of the present disclosure, for example, the heater in the fuel cell system according to the fifth aspect heats the oxidant flowing between the oxidant outlet of the heat exchanger and the exit of the oxidant feed path. In the sixth aspect, the oxidant is heated by the heater after being heated at the heat exchanger. This reduces the amount of heat the heater needs to produce, thereby making the fuel cell system more efficient.

In a seventh aspect of the present disclosure, for example, the fuel cell system according to any one of the first to sixth aspects further includes a heater that heats the inside of the regenerator. In the seventh aspect, the inside of the regenerator can be maintained at a desired temperature, and therefore the oxidation of the mediator can be accelerated, by turning on the heater as necessary.

In an eighth aspect of the present disclosure, for example, the heat exchanger in the fuel cell system according to any one of the first to seventh aspects is a condenser, and the fuel cell system further includes a water drain path that is connected to the heat exchanger and through which condensation resulting from the heat exchange between the oxidant and the gas at the heat exchanger is discharged out of the heat exchanger. In the eighth aspect, the water drain path allows condensation discharged from the inside to the outside of the heat exchanger.

EMBODIMENTS

The following describes embodiments of the present disclosure with reference to drawings. It should be noted that the following embodiments are merely for illustrative purposes, and fuel cell systems according to the present disclosure are not limited to these embodiments.

As illustrated in FIG. 1, a fuel cell system 1a includes a fuel cell 10, a regenerator 20, an oxidant feed path 31, a gas discharge path 32, and a heat exchanger 35. The fuel cell 10 has a cathode 11 and an anode 12 and generates electricity by reducing a mediator with the cathode 11. The regenerator 20 oxidizes, with an oxidant, the mediator reduced by the cathode 11. Through the oxidant feed path 31, the oxidant is supplied to the regenerator 20. Through the gas discharge path 32, the gas present inside the regenerator 20 is discharged out of the regenerator 20.

In the fuel cell system 1a, any kind of fuel and any kind of oxidant for regenerating the mediator can be used. For example, the fuel cell system 1a operates with hydrogen as the fuel and air as the oxidant. In FIG. 1, the solid-line arrows represent the flow of the fuel, the broken-line arrows represent the flow of the mediator, the arrow with a dash dot line represents the flow of the oxidant, and the arrow with a dash double-dot line represents the flow of the gas discharged from the regenerator.

The fuel cell 10 is, for example, a solid-polymer fuel cell. The cathode 11 can be made of a known material for the cathode of a solid-polymer fuel cell. Although the cathode of ordinary solid-polymer fuel cells contains platinum, the material for the cathode 11 does not need to contain it because the mediator is more reducible at the cathode 11 than oxygen. The anode 12 can be made of a known material for the anode of a solid-polymer fuel cell. Typically, the fuel cell 10 further includes an electrolyte membrane 13. The electrolyte membrane 13 is between the cathode 11 and the anode 12 and conducts protons. The cathode 11 and the anode 12 are separated by the electrolyte membrane 13. The electrolyte membrane 13 can be made of a known material for the electrolyte of a solid-polymer fuel cell, such as Nafion®.

While the fuel cell 10 is operating, the anode 12 is supplied with, for example, fuel gas containing hydrogen gas. At the anode 12, the hydrogen is separated into protons $H^+$ and electrons $e^-$. The protons then move to the cathode 11 through the electrolyte membrane 13, whereas the electrons $e^-$ move to the cathode 11 via an external circuit (not illustrated).

As illustrated in FIG. 1, the fuel cell system 1a further includes, for example, a circulation path 14. The circulation path 14 loops between the cathode 11 and the regenerator 20, and through the circulation path 14 the mediator discharged from the cathode 11 is guided to the regenerator 20, and the mediator oxidized at the regenerator 20 is returned to the cathode 11.

The circulation path 14 includes, for example, a first path 14a and a second path 14b. The first path 14a connects the mediator outlet of the cathode 11 to the mediator inlet of the regenerator 20. The second path 14b connects the mediator outlet of the regenerator 20 to the mediator inlet of the cathode 11. While the fuel cell 10 is operating, the cathode 11 is supplied with, for example, a mediator-containing solution. In this solution, the mediator is in its oxidized state $Med_{ox}$. The oxidized mediator $Med_{ox}$ is reduced at the cathode 11, turning into a reduced mediator $Med_{red}$, and leaves the fuel cell 10. The solution containing the reduced mediator $Med_{red}$ is supplied to the regenerator 20 through the first path 14a. At the regenerator 20, the reduced mediator $Med_{red}$ is oxidized by oxygen, the active ingredient of the oxidant, turning into the oxidized form $Med_{ox}$ of the mediator. This is the regeneration of the mediator. The mediator regenerated at the regenerator 20 is supplied to the cathode 11 through the second path 14b.

The oxidation of the reduced mediator $Med_{red}$ is typically exothermic. The inside of the regenerator 20 therefore tends to be hot (e.g., 100° C.). Since the high temperature causes part of the solvent (e.g., water) in the mediator solution to evaporate, there is a hot gas inside the regenerator 20. The gas inside the regenerator 20 may contain unreacted oxidant. The oxidation of the mediator also produces water, and the heat produced with the oxidation of the mediator causes part of this volume of water to evaporate. The gas inside the regenerator 20, however, is discharged out of the regenerator 20 through the gas discharge path 32. This prevents the mediator solution inside the regenerator 20 from being deficient in the mediator, thereby preventing the associated decrease in the efficiency of the fuel cell 10 in power generation. Through the gas discharge path 32, the unreacted oxidant may be discharged out of the regenerator 20. At the same time, the regenerator 20 is supplied with the oxidant (e.g., external air) through the oxidant feed path 31.

At the heat exchanger 35, the oxidant flowing in the oxidant feed path 31 and the gas flowing in the gas discharge path 32 exchange heat. The oxidant flowing in the oxidant feed path 31 is heated, whereas the gas flowing in the gas discharge path 32 is cooled. This reduces the temperature of the gas discharged from the regenerator 20 out of the fuel cell system 1a, thereby allowing for safe discharge of the gas present inside the regenerator 20 out of the fuel cell system 1a. The gas flowing in the gas discharge path 32 contains, for example, steam. At the heat exchanger 35, therefore, condensation can form. In an exemplary configuration, the heat exchanger 35 can serve as a condenser. To accelerate the oxidation of the mediator, it is advantageous that the oxidant be supplied at a high temperature to the regenerator 20. Heating the oxidant at the heat exchanger 35 ensures that the oxidant is supplied at an increased temperature to the regenerator 20, thereby leading to accelerated oxidation of the mediator at the regenerator 20.

The heat exchanger 35 does not need to be a particular type of heat exchanger as long as it is capable of exchanging heat between the oxidant flowing in the oxidant feed path 31 and the gas flowing in the gas discharge path 32. The heat exchanger 35 has, for example, at least one of features (i) to (iii) listed below. The heat exchanger 35 can be, for example, a plate heat exchanger or a fin-tube heat exchanger.

(i) The oxidant feed path 31 is positioned near the gas discharge path 32.

(ii) The component(s) forming the oxidant feed path 31 is in contact with the component(s) forming the gas discharge path 32.

(iii) The oxidant feed path 31 and the gas discharge path 32 are separated by a material suitable for the purpose of heat exchange.

Any kind of mediator can be used as long as it is more reducible than oxygen gas and can be reduced and oxidized repeatedly. To name a few, the mediator can be a polyoxometalate, metal ions, or a metal complex. Polyoxometalates that can be used include phosphomolybdic acid, phosphovanadic acid, and phosphotungstic acid, and examples of metals polyoxometalates can have include vanadium, molybdenum, and tungsten. Examples of metal complexes include porphyrin metal complexes, TEMPO (2,2,6,6-tetramethylpiperidine 1-oxyl)-coordinated metal complexes, and metal complexes coordinated by an oxidase or its derivative. The oxidase can be, to name a few, galactose oxidase, bilirubin oxidase, or glucose oxidase. The mediator solution may contain multiple mediators.

The mediator typically circulates between the cathode 11 and the regenerator 20 in solution form. The higher the mediator concentration of the solution is, the faster the mediator is reduced at the cathode 11. It is therefore advantageous that the mediator be highly soluble in a predetermined solvent, such as water, at the temperature at which it is used. An example of a solvent in the mediator solution is water, and the mediator may contain an acid component, such as sulfuric acid or phosphoric acid. The pH of the mediator solution may be acidic. The mediator solution may contain an appropriate electrolyte.

As illustrated in FIG. 1, the fuel cell system 1a further includes, for example, a pump 16. The pump 16 operates to guide the mediator-containing solution to the regenerator 20 through the first path 14a and the mediator-containing solution to the cathode 11 through the second path 14b. The pump 16 is located, for example, in the second path 14b. The pump 16 may be in the first path 14a. The pump 16 is, for example, a displacement pump, such as a piston pump, a plunger pump, a gear pump, or a vane pump. There may be a regulator in the first or second path 14a or 14b for controlling the flow rate of the mediator.

In an exemplary configuration, the mediator-containing solution is cooled while it is guided to the cathode 11 through the second path 14b. The mediator-containing solution is therefore supplied at a lowered temperature to the cathode 11. This prevents the degradation of the electrolyte membrane 13 or similar component of the fuel cell 10, thereby helping extend the service life of the fuel cell 10. In an exemplary configuration, the second path 14b releases more heat per second than the first path 14a does. In an exemplary configuration, this relationship is satisfied during the normal operation of the fuel cell system 1a. The normal operation of the fuel cell system 1a is to continue generating a predetermined output power (e.g., 100 W or more) for a predetermined period of time.

In the fuel cell system 1a, for example, at least part of the second path 14b is defined by tubing made of a material having a higher thermal conductivity than the material for the tubing defining the first path 14a. This helps the heat of the mediator-containing solution in the second path 14b go out of the second path 14b, thereby helping the mediator-containing solution to be cooled in the second path 14b. The thermal conductivity of the material for the tubing defining the first path 14a and that of the material for the tubing defining the second path 14b are, for example, values at 25° C.

In the fuel cell system 1a, for example, the second path 14b is longer than the first path 14a. This helps increase the release of heat from the mediator-containing solution in the second path 14b, thereby helping the mediator-containing solution to be cooled appropriately in the second path 14b. In an exemplary configuration, the tubing defining the second path 14b has a greater surface area than that defining the first path 14a. This also helps increase the release of heat from the mediator-containing solution in the second path 14b. The tubing defining the second path 14b may be made of a metallic material. The tubing defining the second path 14b may be fitted with a fin. At least part of the tubing defining the second path 14b may be in contact with a space through which air can pass. For example, the fuel cell system 1a may include an enclosure (not illustrated) having an air inlet and an air outlet, and at least part of the tubing defining the second path 14b may be in contact with the air passage extending from the air inlet to the air outlet of this enclosure. The fuel cell system 1a may further include, for example, a fan or blower (not illustrated). In an exemplary configuration, the fan or blower operates to produce a stream of air that passes across at least part of the tubing defining the second path 14b.

The fuel cell system 1a further includes, for example, a fuel gas feed path 15a and an anode off-gas discharge path 15b. Each of the fuel gas feed path 15a and anode off-gas discharge path 15b is connected to the anode 12. Through the fuel gas feed path 15a hydrogen-containing fuel is supplied to the anode 12, and unreacted fuel (anode off-gas) is recovered from the fuel cell 10 through the anode off-gas discharge path 15b.

The fuel cell system 1a further includes, for example, a blower 40, and air sent out from the blower 40 is supplied to the regenerator 20 through the oxidant feed path 31. In an exemplary configuration, the blower 40 operates to take in external air and send it out to the oxidant feed path 31.

The regenerator 20 is not limited to a particular form as long as it allows a solution containing the reduced mediator to come into contact with the oxidant. The regenerator 20 may be a bath reactor or may be a column reactor. In an exemplary configuration, the regenerator 20 retains a solution containing the mediator. In this case the oxidant that has passed through the oxidant feed path 31 is, for example, blown into the mediator-containing solution retained in the regenerator 20. The mediator solution may be in jet stream or tiny droplet (mist) form. The air in this case is, for example, blown out from the exit 31e of the oxidant feed path 31 toward the jet stream or tiny droplets of the mediator solution. This allows the mediator solution to meet the gas present inside the regenerator 20 with a larger interface, thereby helping accelerate the oxidation of the mediator.

As illustrated in FIG. 1, the fuel cell system 1a further includes, for example, a heater 25 (second heater). The heater 25 heats the inside of the regenerator 20. Heating the inside of the regenerator 20 with the heater 25 helps the water produced with the oxidation of the mediator evaporate. Since the mediator is usually nonvolatile, this operation of heating eliminates water from the regenerator 20, thereby preventing the mediator solution inside the regenerator 20 from being deficient in the mediator. Moreover, the oxidation of the mediator is accelerated because the internal temperature of the regenerator 20 is maintained within a desired range.

Any type of heater 25 can be used as long as it is capable of heating the inside of the regenerator 20. The heater 25 can be, for example, an electrically powered resistance heater or a heater having a passage for a heating medium to pass through. The heater 25 has been fitted on, for example, the outer surface of the regenerator 20. For example, the heater 25 covers at least part of the outer surface of the regenerator 20. The heater 25 may surround at least part of the outer surface of the regenerator 20. The heater 25 may alternatively be inside the regenerator 20. The fuel cell system 1a may further include, for example, a stirrer (not illustrated). The stirrer in this case stirs the mediator solution inside the regenerator 20, helping maintain the temperature of the mediator solution inside the regenerator 20 spatially uniform.

The heater 25 does not need to produce heat throughout the oxidation of the mediator at the regenerator 20. In many cases, the oxidation of a mediator is exothermic. The heater 25 may therefore be off while the heat produced with the oxidation of the mediator is maintaining the inside of the regenerator 20 at a temperature appropriate for the prevention of the dilution of the mediator in the mediator solution. The heater 25 produces heat in the event of a low external temperature or other circumstances that make it difficult to keep the internal temperature of the regenerator 20 within a desired range. The fuel cell system 1a may further include a temperature sensor (not illustrated). This temperature sensor, for example a thermistor-based or thermocouple-based one, detects the internal temperature of the regenerator 20. In an exemplary configuration, the heat production by the heater 25 is controlled on the basis of the temperature detected by the temperature sensor. The heater 25 can be omitted in certain cases.

The fuel cell system 1a may further include, for example, a thermal insulator (not illustrated) that covers at least part of the first path 14a. This thermal insulator prevents the mediator-containing solution from cooling in the first path 14a. This helps maintain the internal temperature of the regenerator 20 at a desired temperature, thereby helping accelerate the oxidation of the mediator. This thermal insulator may be a hollow material that provides an air space. The thermal insulator may cover the entire first path 14a. Here, the forms of covering contemplated by the verb "cover" can include thermal insulation achieved by putting the thermal insulator directly on the component(s) that forms the first path 14a and covering the first path 14a with the thermal insulator with a space or a certain material interposed therebetween.

The fuel cell system 1a may further include, for example, a thermal insulator (not illustrated) that covers at least part of the regenerator 20. This thermal insulator helps maintain the inside of the regenerator 20 at a desired temperature. Moreover, the thermal insulator reduces the external supply of energy required to maintain the inside of the regenerator 20 at a desired temperature. This thermal insulator may be a hollow material that provides an air space. The thermal insulator may cover the entire regenerator 20. Here, the forms of covering contemplated by the verb "cover" can include thermal insulation achieved by putting the thermal insulator directly on the regenerator 20 and covering the regenerator 20 with the thermal insulator with a space or a certain material interposed therebetween.

The thermal insulators can be made of any material. Examples of materials for the thermal insulators include resin, metal, glass, and a ceramic material. The form of the thermal insulators is not critical either. The thermal insulators can be, for example, pieces of foam or masses of fiber.

The fuel cell system 1a can be modified for various purposes. For example, the fuel cell system 1a may be modified to include a heat exchanger that exchanges heat between the mediator solution flowing in the first path 14a and that flowing in the second path 14b. The mediator solution in the second path 14b is typically hotter than that in the first path 14a because of the heat produced with the oxidation of the mediator at the regenerator 20. The heat exchange between the mediator solution flowing in the first path 14a and that flowing in the second path 14b therefore tends to cool the mediator supplied to the cathode 11. This helps extend the service life of the fuel cell 10. The mediator solution flowing in the first path 14a, moreover, is heated by the heat exchange between the mediator solution flowing in the first path 14a and that flowing in the second path 14b. This helps maintain the internal temperature of the regenerator 20 at a desired temperature, thereby helping accelerate the oxidation of the mediator.

To take another example, the fuel cell system 1a may be modified to include a heat exchanger that exchanges heat between the mediator solution flowing in the second path 14b and the oxidant flowing in the oxidant feed path 31. Typically, the oxidant flowing in the oxidant feed path 31 is colder than the mediator solution flowing in the second path 14b. The heat exchange between the mediator solution flowing in the second path 14b and the oxidant flowing in the oxidant feed path 31 therefore cools the mediator solution flowing in the second path 14b. This helps the mediator to be supplied at a lowered temperature to the cathode 11, thereby helping extend the service life of the fuel cell 10. The oxidant flowing in the oxidant feed path 31, moreover, is heated by the heat exchange between the mediator solution flowing in the second path 14b and the oxidant, helping the oxidant to be supplied at an increased temperature to the regenerator 20. This helps accelerate the oxidation of the mediator.

The fuel cell system 1a may be modified to, for example, further include a tank that is in the second path 14b and retains the mediator oxidized at the regenerator 20. This helps make the regenerator 20 smaller in size. Moreover, by reducing the external supply of energy required to maintain the inside of the regenerator 20 at a desired temperature, the tank helps improve the efficiency of the fuel cell system 1a. This tank may be in the second path 14b between the regenerator 20 and the pump 30 or may be in the second path 14b between the pump 30 and the cathode 11.

Figure 2:
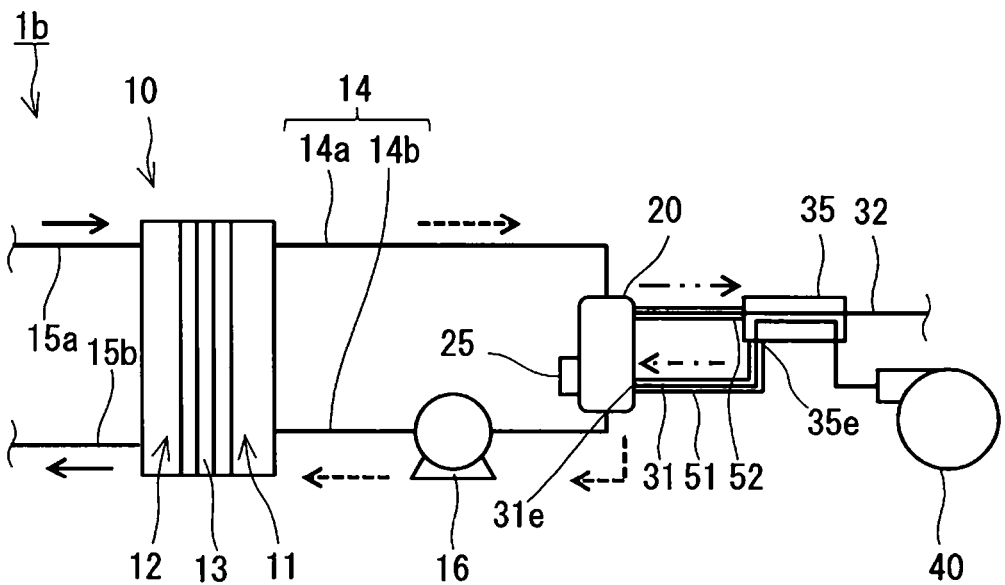
FIG. 2 illustrates another example of a fuel cell system according to the present disclosure.
Figure 3:
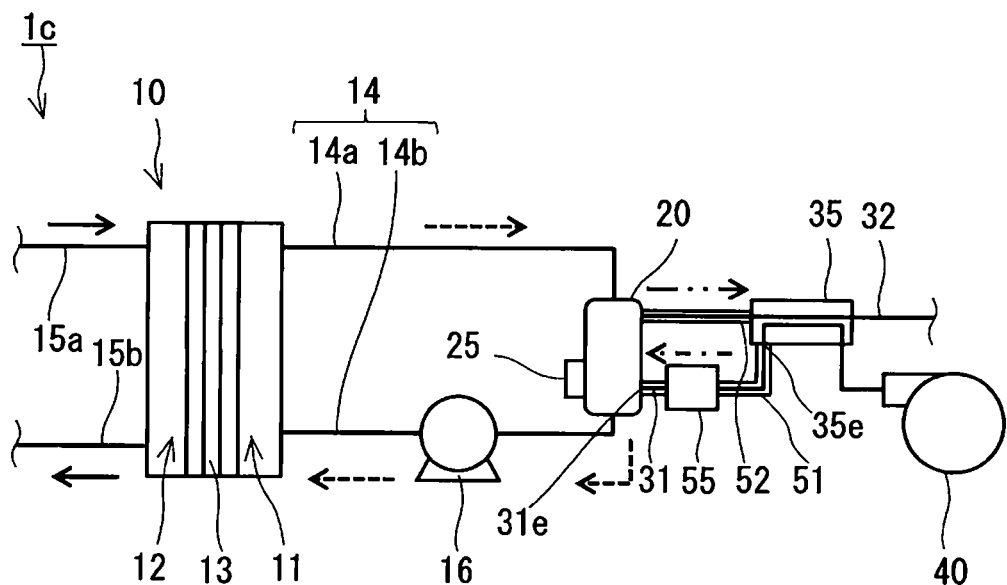
FIG. 3 illustrates yet another example of a fuel cell system according to the present disclosure.
Figure 4:
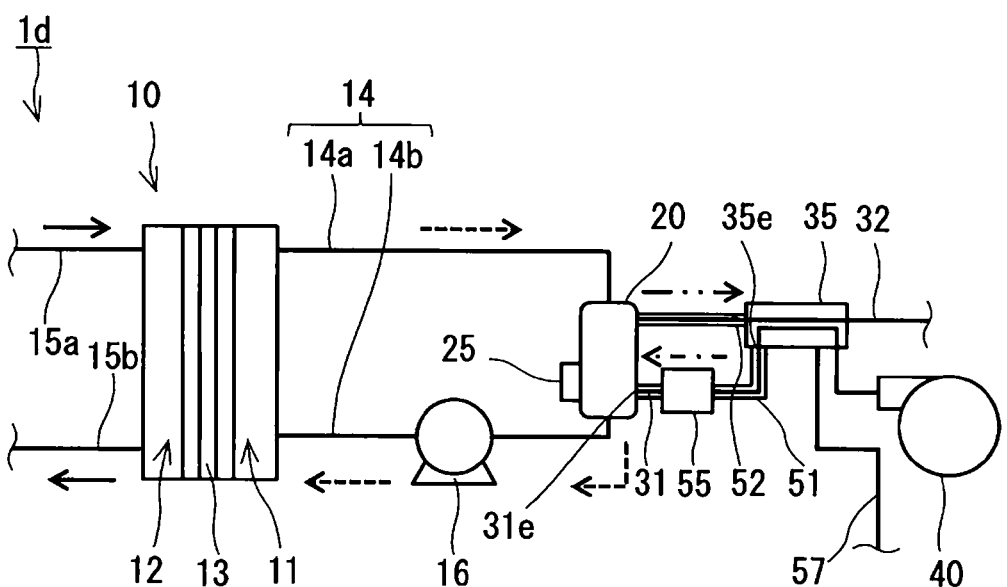
FIG. 4 illustrates yet another example of a fuel cell system according to the present disclosure.

The fuel cell system 1a may be changed as in the fuel cell system 1b illustrated in FIG. 2, the fuel cell system 1c illustrated in FIG. 3, or the fuel cell system 1d illustrated in FIG. 4. Unless otherwise specified, the structure of the fuel cell systems 1b to 1d is the same as that of the fuel cell system 1a. Any structural element of the fuel cell systems 1b to 1d that is also used in the fuel cell system 1a or corresponds to a structural element of the fuel cell system 1a is referenced by the same designator as in the fuel cell system 1a without a detailed description. A description of the fuel cell system 1a is also true for the fuel cell systems 1b to 1d unless technically contradictory.

As illustrated in FIG. 2, the fuel cell system 1b further includes, for example, a first thermal insulator 51. The first thermal insulator 51 covers at least part of the oxidant feed path 31 between the heat exchanger 35 and regenerator 20. The first thermal insulator 51 keeps the oxidant hot after heating at the heat exchanger 35, thereby allowing a hot oxidant to be supplied to the regenerator 20. This helps accelerate the oxidation of the mediator at the regenerator 20. The first thermal insulator 51 may be a hollow material that provides an air space. The first thermal insulator 51 may cover the entire oxidant feed path 31 between the heat exchanger 35 and the regenerator 20.

As illustrated in FIG. 2, the fuel cell system 1b further includes, for example, a second thermal insulator 52. The second thermal insulator 52 covers at least part of the gas discharge path 32 between the regenerator 20 and the heat exchanger 35. The second thermal insulator 52 keeps the gas discharged from the regenerator 20 hot, thereby helping the oxidant to be heated to a high temperature at the heat exchanger 35. This helps accelerate the oxidation of the mediator at the regenerator 20. The second thermal insulator 52 may be a hollow material that provides an air space. The second thermal insulator 52 may cover the entire gas discharge path 32 between the heat exchanger 35 and the regenerator 20.

The first and second thermal insulators 51 and 52 may be formed integrally. In other words, the fuel cell system 1b may include a single thermal insulator that serves as both the first and second thermal insulators 51 and 52.

As illustrated in FIG. 3, the fuel cell system 1c further includes, for example, a heater 55 (first heater). The heater 55 heats the oxidant flowing in the oxidant feed path 31. This allows the oxidant to be supplied at a desired temperature to the regenerator 20, thereby helping accelerate the oxidation of the mediator at the regenerator 20.

The heater 55 heats, for example, the oxidant flowing between the oxidant outlet 35e of the heat exchanger 35 and the exit 31e of the oxidant feed path 31. The oxidant is therefore heated by the heater 55 after being heated at the heat exchanger 35. This reduces the amount of heat the heater 55 needs to produce, helping improve the efficiency of the fuel cell system 1c.

The heater 55 can be of any type as long as it is capable of heating the oxidant flowing in the oxidant feed path 31. The heater 55 can be, for example, an electrically powered resistance heater or a heater having a passage for a heating medium to pass through. The heater 55 has been fitted on, for example, the outer surface of the tubing defining the oxidant feed path 31. For example, the heater 55 covers at least part of the outer surface of the tubing defining the oxidant feed path 31 between the heat exchanger 35 and the regenerator 20. The heater 55 may alternatively be inside the tubing defining the oxidant feed path 31. Here, the forms of covering contemplated by the verb "cover" can include thermal insulation achieved by putting the heater 55 directly on the outer surface of the tubing defining the oxidant feed path 31 and covering the outer surface of the tubing defining the oxidant feed path 31 with the heater 55 with a space or a certain material interposed therebetween.

The heater 55 does not need to produce heat throughout the oxidation of the mediator at the regenerator 20. The heater 55 may be off while the oxidant flowing in the oxidant feed path 31 is sufficiently heated by the heat exchange between the oxidant and the gas flowing in the gas discharge path 32 at the heat exchanger 35. The heater 55 produces heat in the event of a low external temperature or other circumstances that make it difficult to heat the oxidant to be supplied to the regenerator 20 to a desired temperature only by the heat exchange between the oxidant flowing in the oxidant feed path 31 and the gas flowing in the gas discharge path 32 at the heat exchanger 35. The fuel cell system 1c may further include a temperature sensor (not illustrated). This temperature sensor, for example a thermistor-based or thermocouple-based one, detects the temperature of the oxidant flowing in the oxidant feed path 31. In an exemplary configuration, the heat production by the heater 55 is controlled on the basis of the temperature detected by the temperature sensor.

As illustrated in FIG. 4, the fuel cell system 1d further includes, for example, a water drain path 57. In the fuel cell system 1d, the heat exchanger 35 is a condenser. The water drain path 57 is connected to the heat exchanger 35. Through the water drain path 57, condensation resulting from the heat exchange between the oxidant and the gas at the heat exchanger 35 is discharged out of the heat exchanger 35. After passing through the water drain path 57, the condensation may be drained from the fuel cell system 1d or may be used for a predetermined process in the fuel cell system 1d.

The structural elements of the fuel cell systems 1a to 1d can be used in combination unless technically contradictory.

What is claimed is:

1. A fuel cell system comprising:
   a fuel cell that includes an anode and a cathode and generates electricity by reducing a mediator at the cathode;
   a regenerator that oxidizes, with an oxidant, the mediator reduced by the cathode;
   an oxidant feed path through which the oxidant is supplied to the regenerator;
   a gas discharge path through which a gas present inside the regenerator is discharged out of the regenerator; and
   a heat exchanger that heats the oxidant by exchanging heat between the oxidant flowing in the oxidant feed path and the gas flowing in the gas discharge path.

2. The fuel cell system according to claim 1, further comprising a circulation path that loops between the cathode and the regenerator
   wherein, through the circulation path, the mediator discharged from the cathode is guided to the regenerator, and the mediator oxidized at the regenerator is returned to the cathode.

3. The fuel cell system according to claim 1, further comprising a thermal insulator that covers at least part of the oxidant feed path between the heat exchanger and the regenerator.

4. The fuel cell system according to claim 1, further comprising a thermal insulator that covers at least part of the gas discharge path between the regenerator and the heat exchanger.

5. The fuel cell system according to claim 1, further comprising a heater that heats the oxidant flowing in the oxidant feed path.

6. The fuel cell system according to claim 5, wherein the heater heats the oxidant flowing between an oxidant outlet of the heat exchanger and an exit of the oxidant feed path.

7. The fuel cell system according to claim 1, further comprising a heater that heats an inside of the regenerator.

8. The fuel cell system according to claim 1, wherein:
   the heat exchanger is a condenser, and
   the fuel cell system further includes a water drain path that is connected to the heat exchanger and through which condensation resulting from the heat exchange between the oxidant and the gas at the heat exchanger is discharged out of the heat exchanger.

\* \* \* \* \*